United States Patent [19]
Oaki et al.

[11] Patent Number: 5,180,956
[45] Date of Patent: Jan. 19, 1993

[54] ADAPTABILITY CONTROLLER FOR ROBOTS

[75] Inventors: Junji Oaki, Tokyo; Shuichi Adachi, Kanagawa; Yutaka Iino, Kanagawa; Takashi Shigemasa, Kanagawa, all of Japan

[73] Assignee: Kabushiki Kaisha Toshiba, Kawasaki, Japan

[21] Appl. No.: 647,032

[22] Filed: Jan. 25, 1991

[30] Foreign Application Priority Data

Mar. 30, 1990 [JP] Japan .................... 2-81203

[51] Int. Cl.$^5$ ............................ G05B 19/42
[52] U.S. Cl. .................. 318/568.11; 318/561; 318/567; 318/568.22; 395/80
[58] Field of Search ........... 318/632, 560, 561, 563, 318/567, 568.1, 568.11, 568.13, 568.17, 568.2, 568.22, 569; 364/513

[56] References Cited

U.S. PATENT DOCUMENTS

| | | | |
|---|---|---|---|
| 3,781,626 | 12/1973 | Kubo et al. | 318/561 |
| 4,488,242 | 12/1984 | Tabata et al. | 318/638 X |
| 4,617,502 | 10/1986 | Sakaue et al. | 318/636 X |
| 4,727,303 | 2/1988 | Morse et al. | 318/631 X |
| 4,808,063 | 2/1989 | Haley | 318/567 |
| 4,882,526 | 11/1989 | Iino et al. | 318/561 |
| 4,893,068 | 1/1990 | Evans, Jr. | 318/618 X |
| 4,925,312 | 5/1990 | Onaga et al. | 318/568.22 X |
| 4,956,594 | 9/1990 | Mizuno et al. | 318/568.22 X |
| 5,049,796 | 8/1991 | Seraji et al. | 318/632 X |

OTHER PUBLICATIONS

Adaptive Linear Controller for Robotic Manipulators, Koivo et al, IEEE Transactions on Automatic Control, vol. AC-28, No. 2, Feb. 1983, pp. 162-171.
Journal of the Robotics Society of Japan, vol. 7-3, pp. 142-147, Y. Ono, 1989.

Primary Examiner—A. Jonathan Wysocki
Assistant Examiner—David Martin
Attorney, Agent, or Firm—Foley & Lardner

[57] ABSTRACT

An adaptive controller for robots for driving an actuator of a robot arm under servo control where a servo constant is set such that the robot arm follows up a predetermined reference movement orbit. The controller has a switching section for switching between an adjustment mode where the servo constant is adjusted and a servo control mode where the servo constant is already set. Also included is a deviation supervising section for which obtains the deviation of an actual operation orbit of the robot arm from the reference movement orbit thereof, and operates the switching section to change the servo control mode into the servo adjustment mode when the obtained deviation exceeds a predetermined value. The controller also has a dynamic-characteristic-model identifying section for identifying the movement characteristic of the robot arm when the servo control mode is changed into the servo adjustment mode by the deviation supervising section and the switching section. A servo constant calculating section is used for calculating a new servo constant for reducing the deviation obtained by the deviation supervising section based on the identification result from the dynamic-characteristic-identifying section.

5 Claims, 13 Drawing Sheets

ADAPTABILITY CONTROLLER FOR ROBOTS

BACKGROUND OF THE INVENTION

1. Field of the Invention

The present invention relates to an adaptive controller for robots, and particularly to an adaptive controller for robots able to automatically adjust load applied to the arm of each robot, the movement characteristic peculiar thereto and the servo constant to be changed with time.

2. Description of the Prior Art

Figure 1:
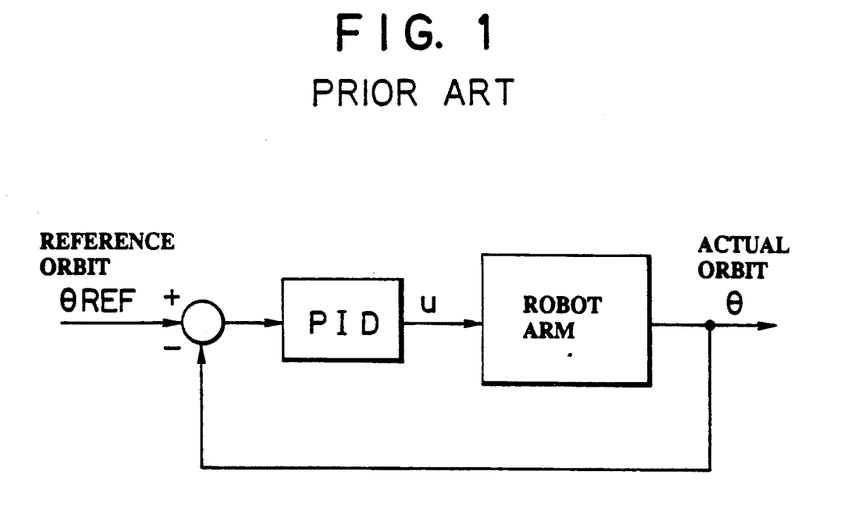
FIG. 1 is a block diagram to show construction of a conventional adaptability controller.

For example, as an adaptive controller for robots, there can be mentioned a motor for carrying out PID (proportional integral and differential) servo control for driving joints of a multi-joint robot as shown in FIG. 1. In such a servo control mechanism, the real rotation angle $\theta$ of the motor is adjusted to a reference value $\theta_{REF}$ thereof.

However, to obtain a suitable PID constant (servo constant) which can realize a desired follow-up property to a reference orbit, a great deal of trial and error in operating the robot must be acquired. Moreover, even in robots constructed in the same mechnism, the movement characteristics are different from one another. Accordingly, it is difficult to guarantee a desired follow-up property in operating these robots by a fixed servo constant. Thus, it is necessary to separately adjust the servo constant for each robot. Therefore, a great deal of effort is required.

Since the movement characteristic changes with time, even in the same robot, it is also necessary to adjust the servo constant in this case. Moreover, adjustment of the servo constant is also required in changing load on an arm of the robot.

For adjusting the servo constant without trial and error, it is necessary to correctly know the movement characteristic of the robot. Generally, to know the movement characteristic of the robot, a known method for identification of the frequency response is employed. Conventionally, for identifying the frequency response, sine wave sweep excitation with a servo analyzer or the like has been used.

For example, to know the movement characteristic by the frequency response, a sine wave of 1 Hz is input to a robot. In the ordinary state, a signal output from the robot follows up the original input signal with fixed shifts of amplitude and phase. The movement characteristic can be known by investigating the shifts of amplitude and phase.

Figure 2A:
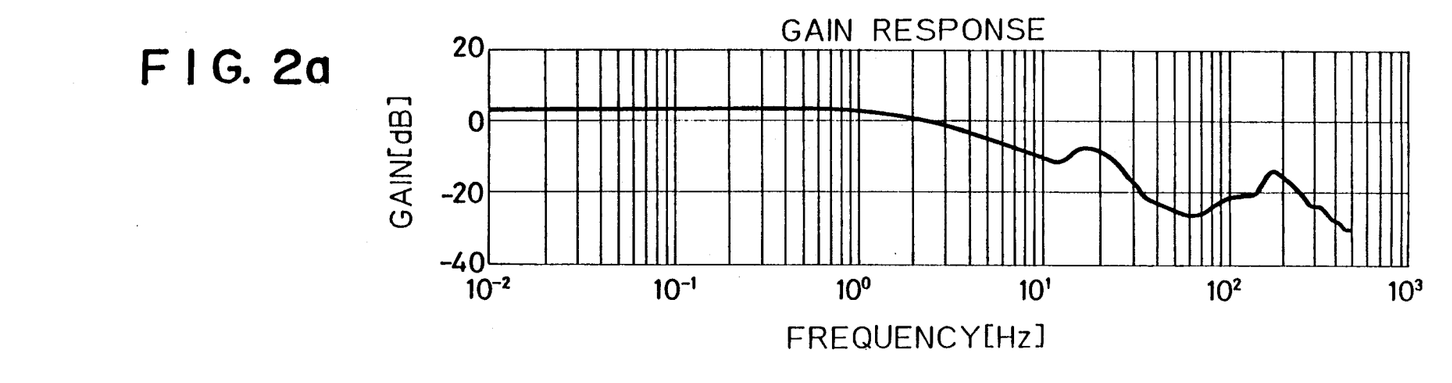
FIGS. 2a and 2b are diagrams to respectively show relations between the frequency and the gain and phase in the conventional example.
Figure 2B:
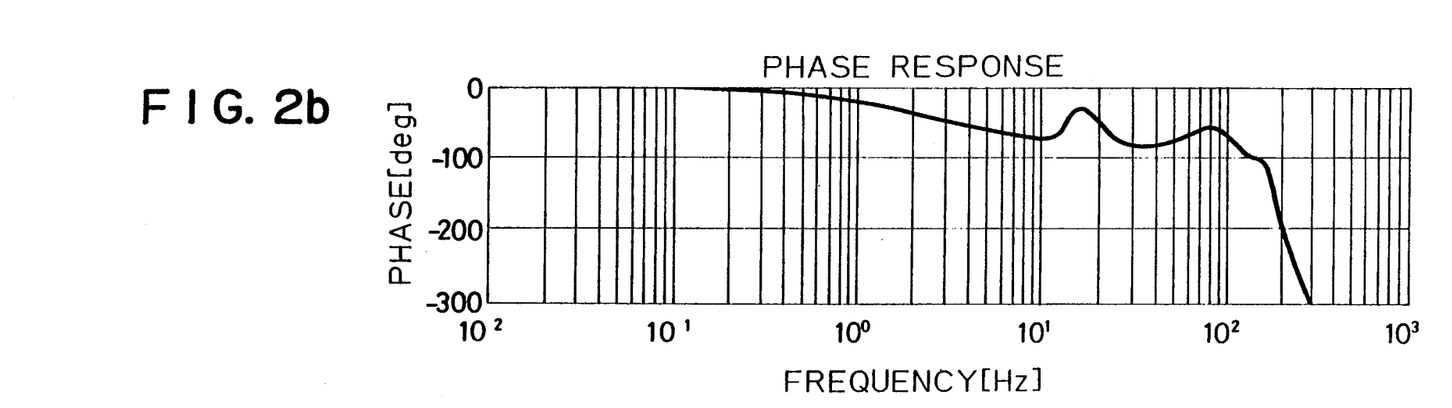

As shown in FIGS. 2a and 2b, the gain or amplitude in the low frequency region from $10^{-2}$ Hz to $10^0$ Hz is about 0 dB and the phase in the same frequency region is about 0°. This means that a robot to be controlled follows up an input sine wave. However, at the frequency of $10^1$ Hz, the gain is about $-10$ dB and the phase is about $-10°$. Moreover, in the frequency region higher than $10^1$ Hz, both of the gain and phase are reduced so that the follow-up property is impaired.

The sine wave sweep method, takes much time to plot amounts of shifts in the gain and phase every time the frequency of the sine wave is changed and inputted. In the case of a large-scale robot, since the frequency is inputted from the low frequency region, the procedure takes a significant amount of time.

When a high frequency is input to a robot for a long time, a great deal of mechanical load is applied to the robot.

Accordingly, in getting the frequency response, the sine wave sweep method is advantageous because the gain and phase can be obtained with certainly by inputting each predetermined frequency every time required. However, to know the movement characteristic of the robot by changing and inputting the frequency, much time would be required and a great deal of mechanical load would be applied to the robot.

As another method of knowing the frequency properties of the movement characteristic of robots, the method of least squares has been recently studied. In this method, a signal to be input is not a sine wave, but a signal including various frequencies, and the frequency response is identified by processing respective input and output data of a robot based on the method of least squares. Using this method, it takes relatively short time to process these data, and the mechanical load to the robot can be reduced.

Figure 3A:
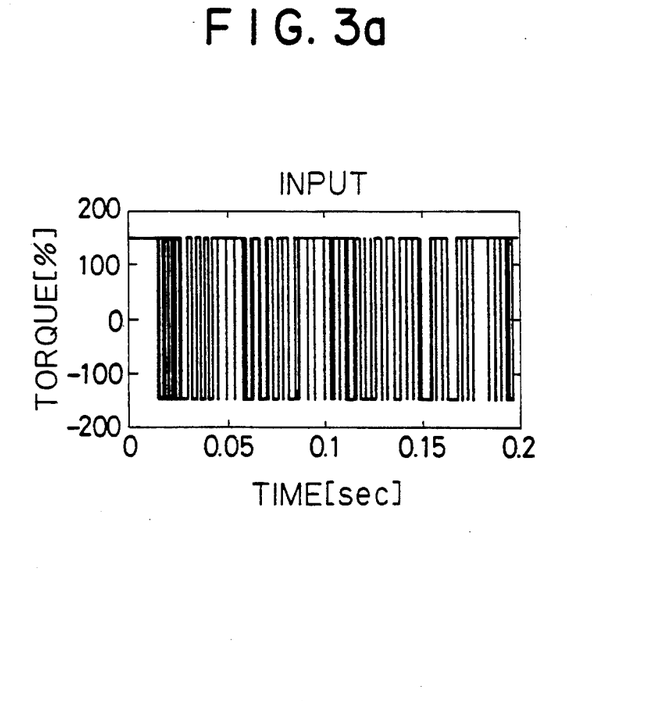
FIG. 3a and 3b are diagrams to respectively show an input and an output signal of a robot in the conventional example.
Figure 3B:
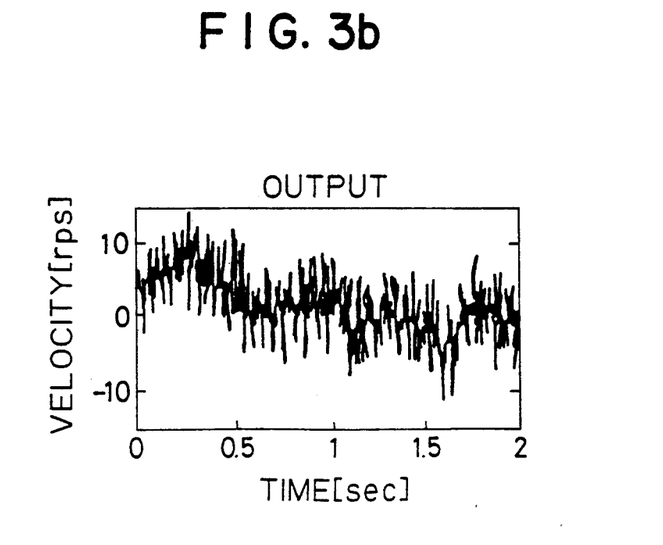

In this method, it is not necessary to input the sine wave, but another type of signal. For example, an maximum-length sequence signal is input as shown in FIG. 3a. When such an maximum-length sequence signal as shown in FIG. 3a is inputted to a robot, a signal to be output therefrom includes various frequencies as shown in FIG. 3b. The output signal is processed based on the method of least squares.

In this method, each shaft of a robot is regarded as one input-output system expressed by a pulse transfer function G ($z^{-1}$), and inertia change of an arm of the robot and interference between the shafts are regarded as disturbance.

Moreover, to each input or output data of each shaft of the robot sampled at a sampling cycle of $\Delta T$, an auto regressive moving average (ARMA) expressed by the following equation is set:

$$A(z^{-1})\theta(k) = B(z^{-1})u(k) + e(k) \quad (1)$$
$$A(z^{-1}) = 1 + a_1 z^{-1} + \ldots + a_z z^{-m}$$
$$B(z^{-1}) = b_1 z^{-1} + \ldots + b_z z^{-m}$$

where $\theta(k)$ and $u(k)$ respectively designate the rotation angular velocity of a motor and the torque command value to motor, and $e(k)$ is the leavings. The motor rotation anglular velocity $\theta(k)$ is obtained by the following equation:

$$\theta(k) = [\theta(k) - \theta(k-1)]/\Delta T \quad (2)$$

By identifying a, b in accordance with the method of least squares based on the reference literature (Takayoshi, Nakamizo, Signal Analysis and System Identification, published by Corona Co., (1988)), the function $G(z^{-1})$ is expressed as follows:

$$G(z^{-1}) = A(z^{-1})/B(z^{-1})$$

Accordingly, the frequency response $G(j\omega)$ can be obtained by substituting $\exp(-j\omega\Delta T)$ for $z^{-1}$ in the function $G(z^{-1})$.

However, when the frequency response up to the high frequency region is required, it is necessary to shorten the sample cycle $\Delta T$ of data, so that the frequency response in the low frequency region can not be obtained correctly because of the characteristic of the method of least squares. Hereinafter, this problem is explained in more detail with reference to drawings.

FIG. 3a shows the input signal, the horizontal axis designates time (Time [sec]) and the vertical axis designates torque (Torque [%]). FIG. 3b shows the output signal. The horizontal axis designates time and the vertical axis designates velocity (Velocity [rps]).

Figure 4A:
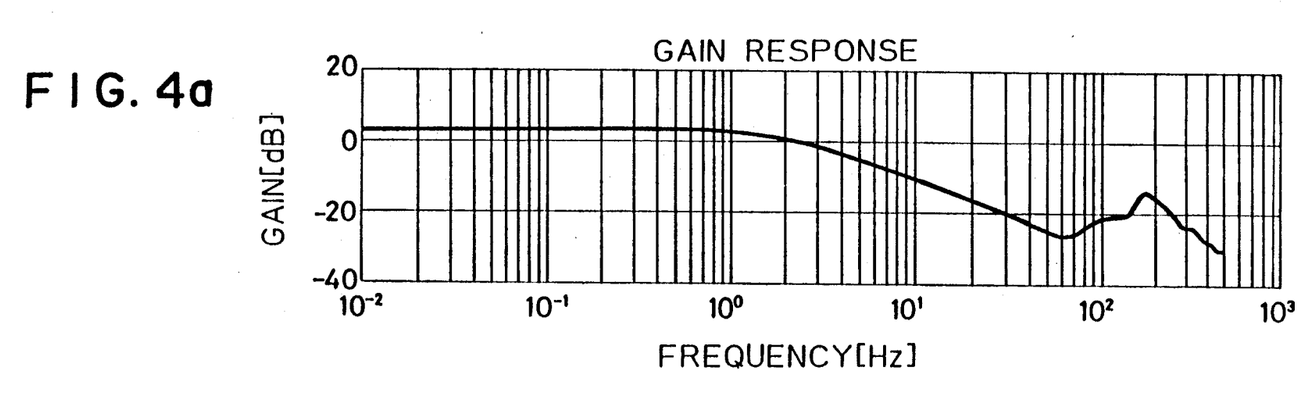
FIGS. 4a and 4b are diagrams to respectively show the relations between the frequency and the gain and phase in another conventional example.
Figure 4B:
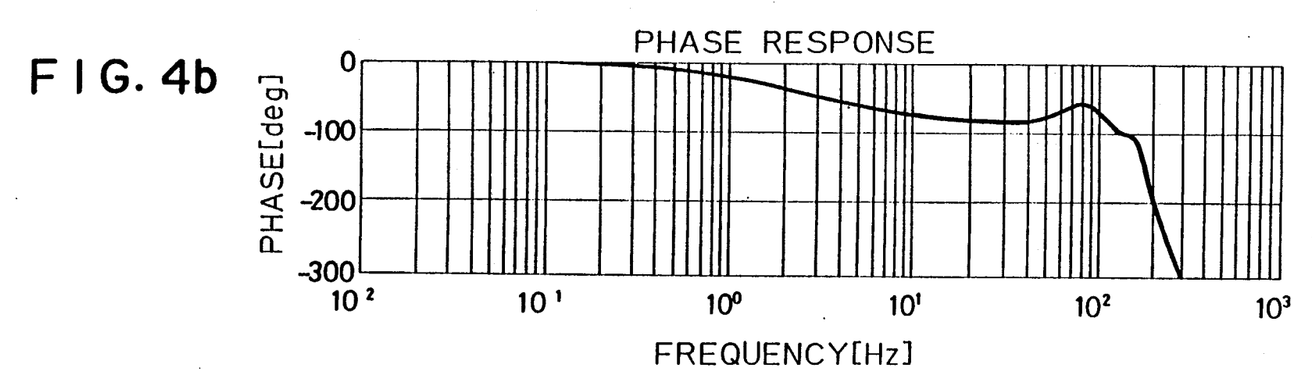

FIG. 4a shows gain (Gain [dB]) against the frequency (Frequency [Hz]) in the identified frequency response estimates. FIG. 4b shows phase (Phase [deg]) against the frequency.

In these drawings, the time required for identification is about two seconds (the number of data each of which is sampled in 1 [ms] is 1990). In this case, though the actual shaft has the resonance points of about 200 Hz, 100 Hz, 20 Hz, in FIGS. 4a and 4b, it is seen that the identification at about 10 Hz and 100 Hz is not well carried out. This case is estimated from the viewpoint of time response, the results are as shown in FIGS. 5a and 5b.

Figure 5A:
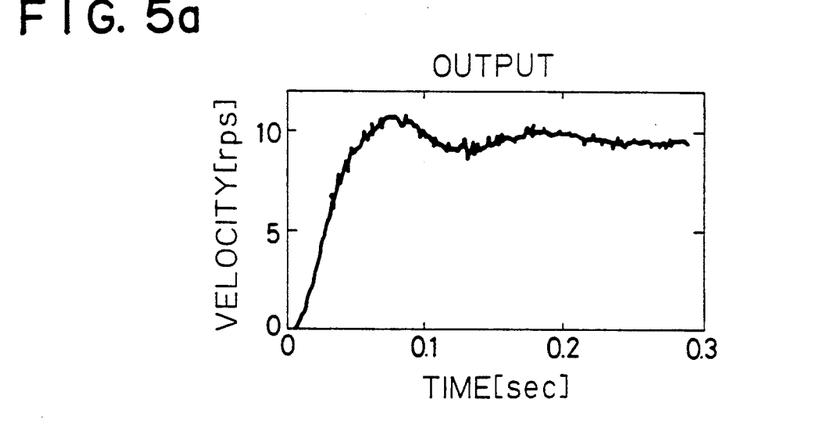
FIG. 5a is a diagram to show an actual step response of a robot.

FIG. 5a shows a step response of the actual robot when a velocity I-P servo constant is given to construct a velocity control loop. In FIG. 5a, the horizontal axis shows time (Time [sec]) and the vertical axis shows velocity (Velocity [rsp]).

Figure 5B:
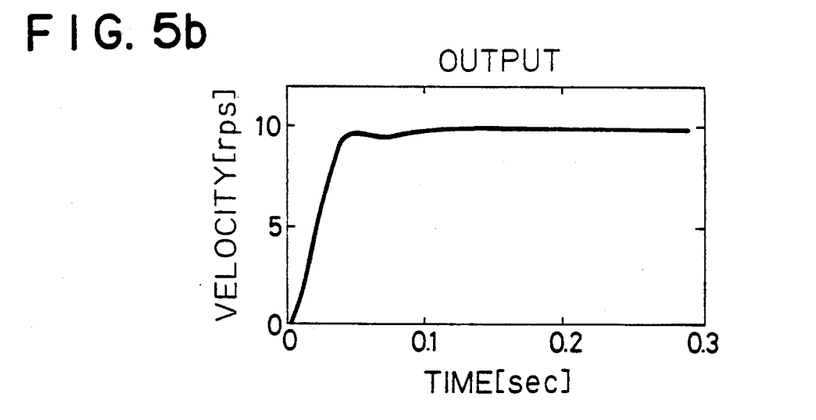
FIG. 5b is a diagram to show a step response obtained by simulation with FIGS. 4a and 4b.

FIG. 5b shows a step response obtained by simulation in the same condition as mentioned above using FIGS. 4a and 4b. Namely, in the simulation of FIG. 5b, the same velocity I-P servo constant is given to FIGS. 4a and 4b to obtain a frequency response of a velocity closed loop, further an obtained frequency response is subjected to the inverse Fourier transformation. From a comparison of the step responses shown in FIGS. 5a and 5b, it is seen that the frequency in the low frequency region is not correctly shown in FIG. 5b.

In such a case, to obtain the frequency response in the low frequency region, various data must be collected by increasing the sampling cycle and operating a robot many times.

Figure 6:
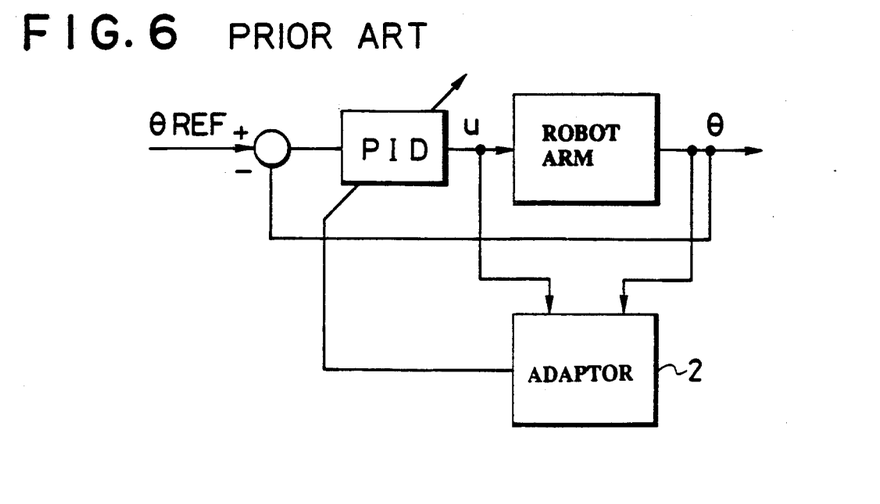
FIG. 6 is a block diagram to show construction of an unpractical adaptability controller based on the on-line method.

As still another case, an adaptive controller based on the on-line method using an adaptor 2 as shown in FIG. 6 has been recently designed. However, since the adaptor 2 carries out identification of the movement characteristic of a robot and calculation of the PID constant at the same time, the amount of real time calculation is extremely large, so that the servo control cycle is increased and the follow-up property is greatly impaired.

Moreover, the algorithm for the adaptor 2 is not completed yet, thus when noise is included in the input and output signals of a robot, the adaptor 2 may get out of order.

As stated above, the conventional adaptability controller for robots requires much trouble adjusting the servo constant, and has defects in the method of identifying the frequency response for backing the adjustment of the servo constant, further the method of adaptability control based on the on-line system has problems in the practical use.

SUMMARY OF THE INVENTION

The present invention was made in the light of the above problem, therefore it is an object of the present invention to provide an adaptability controller of robots which can automatically obtain a suitable servo constant for coping with change of load applied to the arm of a robot and change of the movement characteristic with time peculiar to each robot, and can reduce trouble for adjusting the servo constant.

To achieve the above object, a feature of the present invention is an adaptability controller for robots, which comprises switching means for switching an adjustment mode where the servo constant is adjusted and a servo control mode where the servo constant is already set, a deviation supervising section for obtaining deviation of an actual operation orbit of a robot from a reference orbit thereof and driving the switching means to change the servo control mode into the servo adjustment mode when the obtained deviation exceeds a predetermined value in a fixed range, dynamic-characteristic-model identifying means for identifying the movement characteristic of the robot when the servo control mode is changed into the servo adjustment mode by the deviation supervising section and the switching means, and a servo constant calculating section for calculating a servo constant for reducing the deviation obtained by the deviation supervising section based on the result of identification from the dynamic-characteristic-identifying means.

Another feature of the present invention is that, in the adaptability controller for robots, a loop in the adjustment mode comprises a signal generating section for generating a signal for identification in a wide region, a dynamic-characteristic-model identifying section for sampling input and output signals when a robot is operated by the signal for identification generated from the signal generating section, dividing the sampled input and output signals respectively into a plurality of frequency regions with a plurality of low-pass transmission filters, sampling again the plurality of input and output signals respectively divided with thinning then out with a cycle corresponding to the frequency regions, processing the thinned-out and resampled input and output signals based on the method of least squares so as to identify the frequency response corresponding to each frequency region, and a servo constant calculating section for calculating the servo constant for the servo control based on the result obtained from the movement-model-identifying section.

According to the first feature of the present invention, the operative mode is ordinarily set in the servo control mode, and the deviation supervising section obtains deviation between the reference orbit of a robot and the actual operation orbit thereof, so as to check whether or not the value exceeds a predetermined range. When the load applied to the arm of a robot is changed in the control mode, or when the deviation exceeds the predetermined value range by dint of change of the servo constant of the robot with time, the deviation supervising section sets the switching means in the operative mode, so as to change the control mode into the adjustment mode.

When the control mode is switched into the adjustment mode, the movement characteristic of an actuator for actuating the robot is identified by the dynamic-characteristic identifying means. Based on the identification result, the servo constant calculating section calculates a new servo constant for reducing the deviation. When the new servo constant is set by the servo constant calculating section, the deviation supervising section recognizes that the deviation gets in the predetermined range, then sets the switching means in the operative mode, so as to change the adjustment mode into the control mode.

On the other hand, according to the second feature, in the adjustment mode, input and output signals obtained when the robot is operated by the identifying signal generated from the signal generating section are sampled by the dynamic-characteristic-model identifying section.

Then, the dynamic-characteristic-model identifying section divides the sampled input and output signals of the robot into a plurality of frequency regions through the plurality of low-pass filters. The signals divided into the plurality of frequency regions are sampled again with thinning-out at cycles corresponding to the cut-off frequencies of the respective low-pass filters.

Then, the plurality of input and output signals sampled again are subjected to the least squares method to obtain frequency responses corresponding to respective frequency regions. The frequency response of a wide frequency region is identified from these frequency responses to respective regions. Based on the result of the dynamic-characteristic-model identifying section, the servo constant calculating section calculates a servo constant for the servo control. Thereafter, in the control mode, the servo control section controls the robot by using the servo constant obtained by the calculation.

Accordingly, it becomes possible to automatically obtain a servo constant (a constant for control) which is suitable for coping with change of load applied to the arm of a robot or change of the movement characteristics peculiar to each robot.

Moreover, as compared with the above-mentioned conventional technology, the time required for adjusting the servo constant can be reduced, and the adjustment itself can be easily carried out.

These and other objects, features and advantages of the present invention will be more apparent from the following description of a preferred embodiment, taken in conjunction with the accompanying drawings.

DETAILED DESCRIPTION OF THE EMBODIMENTS

Hereinafter, an embodiment of an adaptability controller for robots related to the present invention will be described with reference to FIGS. 7 to 13.

Figure 7:
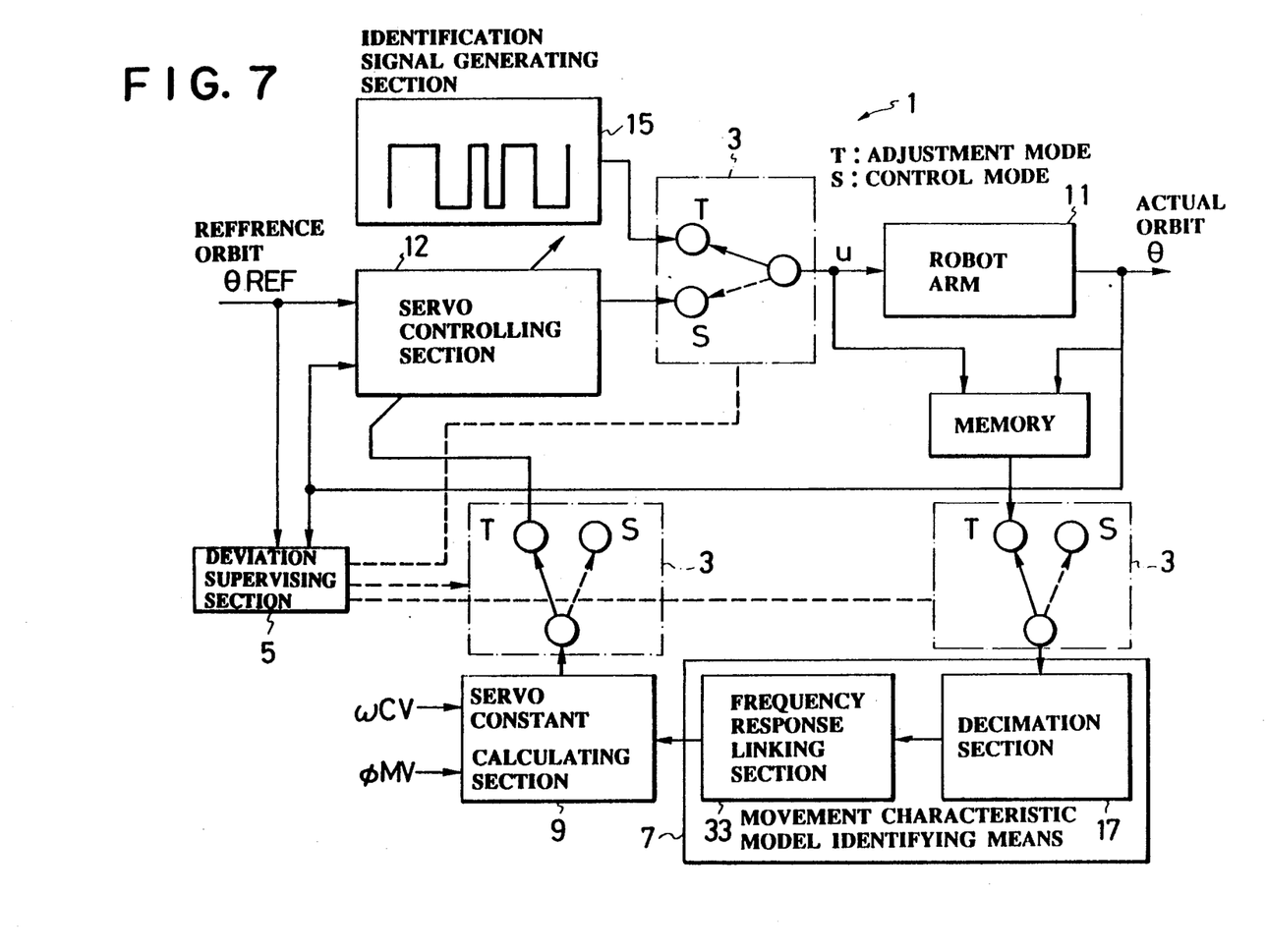
FIG. 7 is a block diagram to show construction of an embodiment of an adaptability controller for robots related to the present invention.
Figure 8:
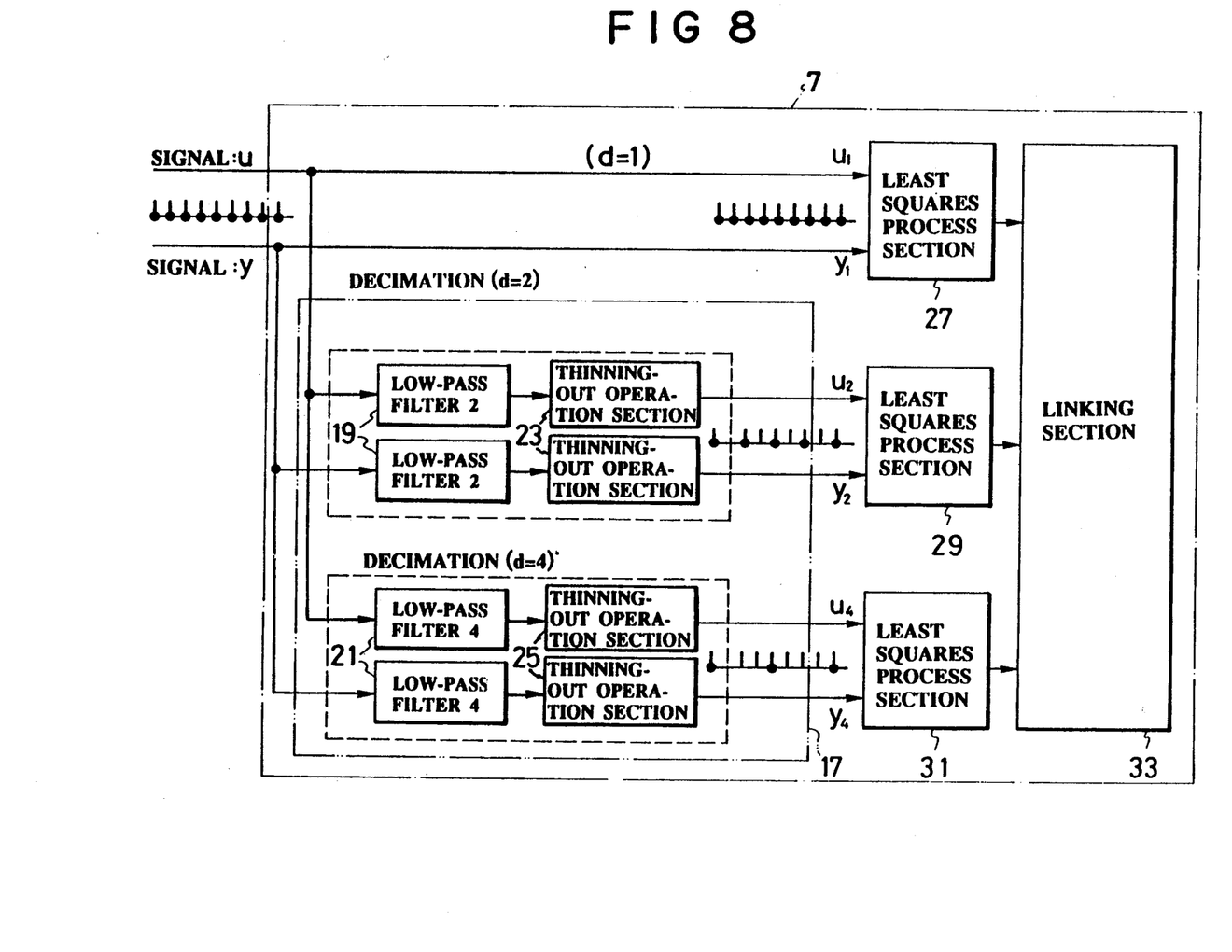
FIG. 8 is a block diagram to show construction of a dynamic-characteristic-model identifying section in the embodiment shown in FIG. 7.

FIGS. 7 and 8 are block diagrams to respectively show construction of an adaptability controller 1 for robots.

The adaptability controller 1 controls, for example, a robot arm 11 which is composed of a multi-joint manipulator not shown in these drawings. In the controller 1, a servo motor is used as an actuator, and a movement of each joint is detected by a motor rotation angle sensor. When the arm 11 is composed of a plurality of shafts, it is necessary to prepare the adaptability controllers for the number of the shafts.

As shown in FIG. 7, in the adaptive controller 1, there is provided a switch 3 which is switching means for switching an adjustment mode T in which a servo constant is adjusted and a control mode S in which a servo constant is set. In FIG. 7, construction in the adjustment mode T is shown by solid lines, while the other construction in the control mode S is shown by dotted lines.

When the operative mode of the controller 1 is set in the control mode S by the switch 3, the robot arm 11 is so controlled as to follow up a reference orbit value $\theta_{REF}$ to be inputted. In the control, the rotation angle $\theta$ of a motor which shows a movement amount of the robot arm 11 is returned to a servo controlling section 13.

Moreover, in the adaptive controller 1, there is provided a deviation supervising section 5 which obtains deviation between the reference orbit $\theta_{REF}$ and an actual orbit $\theta$ in the movement, and changes the control mode 3 into the adjustment mode T by operating the switching means 3 when the deviation exceeds a predetermined range.

Besides, there are also provided dynamic-characteristic-model identifying means 7 for identifying the movement characteristic of the robot arm 11 when the switching from the control mode S to the adjustment mode T is carried out by the deviation supervising section 5, and a servo constant calculating section 9 for calculating a servo constant to lessen the deviation obtained by the deviation supervising section 5 based on the identification result from the dynamic-characteristic identifying means Furthermore, there is provided an identification signal generating section 15 for generating a signal for identification which has a wide frequency region when the adjustment mode T is set.

In such construction, the dynamic-characteristic-model identifying section 7 is composed of a decimation section 17 and a frequency response section 33. Further, the decimation section 17 is composed of low-pass filters 19, 21 and thinning-out operation sections 23, 25 as shown in FIG. 8.

The low-pass filters 19, 21 respectively sample an input signal u and an output signal y when the robot arm 11 is operated by the identification signal from the identification signal generating section 15, and divide the signals u, y into a plurality of frequency regions.

While, the thinning-out operation sections 23, 25 respectively sample again the divided input and output signals by thinning out at cycles respectively corresponding to the plurality of frequency regions.

Moreover, least squares process sections 27, 29, 31 identify the frequency responses corresponding to respective frequency regions by using the plurality of input and output signals which are sampled again with thinning. Then, a frequency over a wide frequency range is obtained at a frequency response linking section 33 by linking the frequency responses respectively identified by the least squares process sections 27, 29, 31.

Next, operation of the adaptive controller 1 constructed as described above is explained.

Ordinarily, the switch 3 is set in the control mode S, and the robot arm 11 is so controlled as to follow up the reference joint orbit by action of the servo control section 13.

During the servo control operation, deviation between the reference joint orbit $\theta_{REF}$ and the actual orbit $\theta$ in the movement of the robot arm 11 is supervised by the deviation supervising section 5.

In this system, when the degree of change of load applied to the robot arm 11 or of change of the servo constant with time exceeds a predetermined allowable range, the deviation supervising section 5 detects it, then operates the switch 3 so as to change the operative mode into the adjustment mode T.

Then, the signal generating section 15 inputs an identification signal (a maximum-length sequence signal shown in FIG. 10a) corresponding to a wide frequency region to a motor of the robot arm 11 to drive joints thereof, then collects joint movement signals. As shown in FIG. 8, each joint movement signal and identification signal are inputted to the dynamic-characteristic-model identifying section 7.

In the dynamic-characteristic-model identifying section 7, an input signal u to the servo motor and a motor rotation angular velocity $\theta$ (given by the equation (2)) are sampled at a possibly short cycle $\Delta T$. This process is given for suppressing loss of information in the high frequency region.

Next, these input and output data are inputted to the low-pass filters 19, 21, and the output is resampled at a cycle of d$\Delta T$. Namely, in this process, every data of the input and output data is resampled through the low-pass filters 19, 21. Accordingly, the cut-off frequency $\omega$ c of the filters corresponds to d. The thinning-out process by using such filters is called decimation in the field of signal process. Then, the resultant data obtained by the decimation are subjected to a process based on the method of least squares as mentioned in the explanation of equation (1) at the least squares process sections 27, 29, 31 so as to identify the frequency response of each shaft to be controlled.

In such a manner, the frequency responses showing the movement characteristic corresponding to respective frequency regions are identified. Then, the identified respective frequency regions are linked at the linking section 33. Thereafter, at the servo constant calculating section 9, a new servo constant is calculated so as to reduce the deviation between the reference orbit and the servo constant obtained from the servo control section 13. Moreover, when the new servo constant is set by the servo constant calculating section 9, the deviation supervising section 5 recognizes that the deviation gets in the predetermined range, and changes the adjustment mode T into the control mode S by operating the switching means 3.

Conventionally, a known frequency range where the identification based on the method of least squares can be carried out with sufficient accuracy is about 1 [decade] between 1/100$\Delta T$ and 1/5$\Delta TB$.

Accordingly, it has been difficult to identify the movement characteristic in a low frequency range considerably far from the sampling frequency region.

However, in this embodiment, when the decimation process is suitably carried out so as to place the focus on the low frequency region, it becomes possible to identify the movement characteristic the low frequency region with high accuracy. Thus, as shown in FIG. 8, since the frequency response corresponding to each frequency region can be identified by each of the plurality of decimation sections, and it is possible to link the respective identification results by the linking section, the frequency response over a wide frequency range can be identified with high accuracy.

Figure 9:
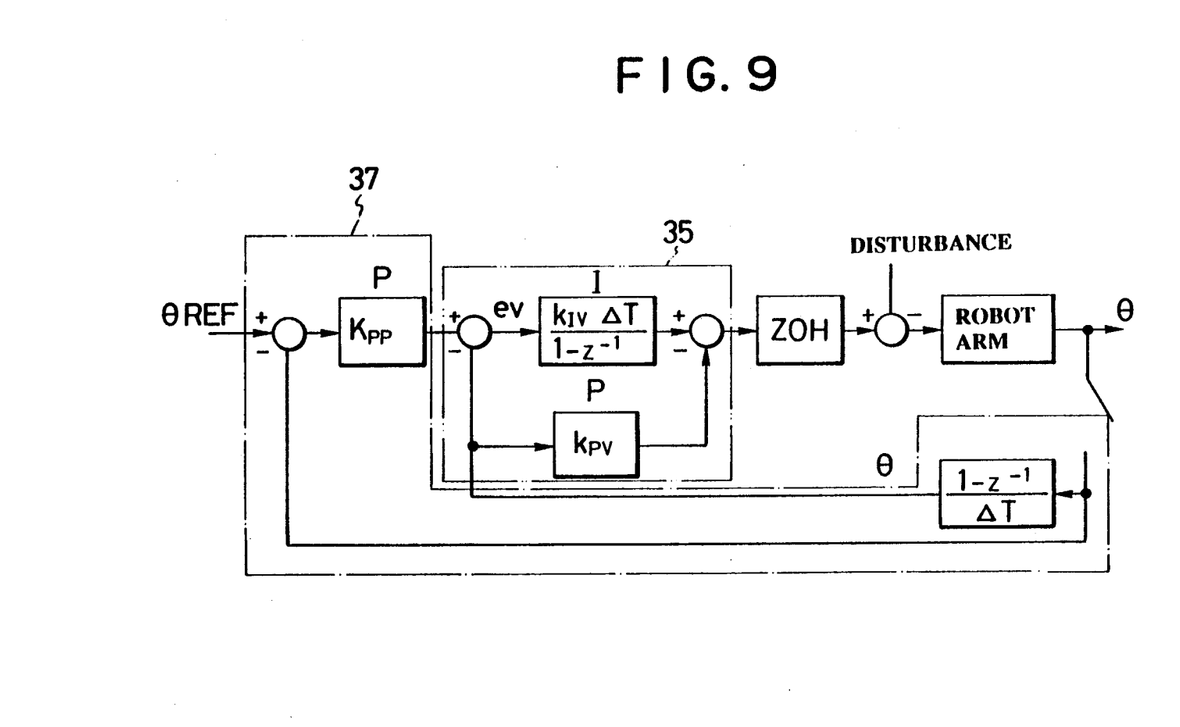
FIG. 9 is a block diagram to show an example of construction of a servo constant calculating section in the embodiment shown in FIG. 7.

As the servo constant calculating section 9, an I-PD control system as shown in FIG. 9 can be mentioned. However, it is also possible to use a I-PD control system.

The I-PD control system comprises a control system 35 as a velocity loop and another control system 37 as a position loop.

By using the transfer function G(j$\omega$), the I-P control system of the velocity loop for deciding the disturbance characteristic is calculated, then the position loop is obtained. Thereafter, the frequency response $G_R(j\omega)$ of the transfer function for one cycle from a velocity loop deviation $e_v$ to a motor rotation angular velocity $\theta$ is expressed by the following equation:

$$G_R(j\omega) = \{k_{IV}/D(j\omega)\} \cdot \{1/(k_{PV}+G(j\omega))\} \quad (4)$$

where $D(j\omega) = \Delta[1-\exp(-j\omega\Delta Ts)]$.

When the cut-off frequency of the velocity loop 35 is $\omega_{cv}$ [rad/sec] and the phase margin decided by $\omega_{cv}$ is $\phi_{MV}$[deg], $G_R(j\omega)$ becomes 1, so that parameters $K_{PV}$ and $K_{IV}$ respectively related to I and P can be obtained as follows by the equation (4).

$$K_{PV} = y + \tan[\phi_v + \pi/180 - \pi/2 + <D(j\omega)] - x \quad (5)$$

$$K_{IV} = D(j\omega)\{(k_{PV}+x)^2 + y^2\}^{\frac{1}{2}} \quad (6)$$

where $x = \cos(<G(j\omega))/G(j\omega)$, $y = -\sin(<G(j\omega)/G(j\omega)$.

In this case, $\phi_{MF}$ is 65° to 70° and $\omega_{cv}$ is given as a frequency around which the phase of $G(j\omega)$ is delayed by 90°.

While, a parameter ($K_{PP}$) related to the position loop 37 is set in the following range:

$$\omega_{cv}/3.0 \leq K_{PP} \leq \omega_{cv}/2.5 \tag{7}$$

Next, an example in which the adaptability controller is applied to an actual industrial robot is explained.

Figure 10A:
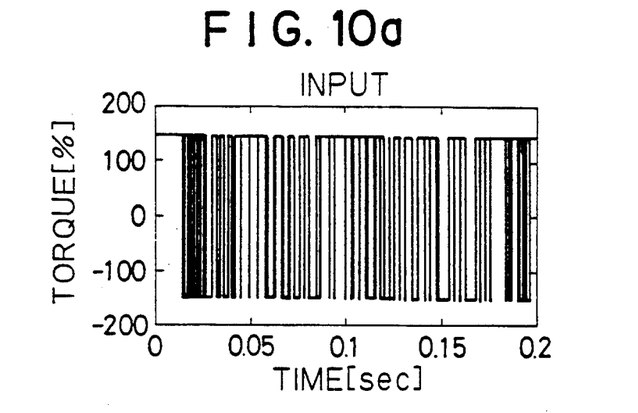
FIG. 10a is a diagram to show a maximum-length sequence signal generated by an identification signal generating section in the embodiment of FIG. 7.
Figure 10B:
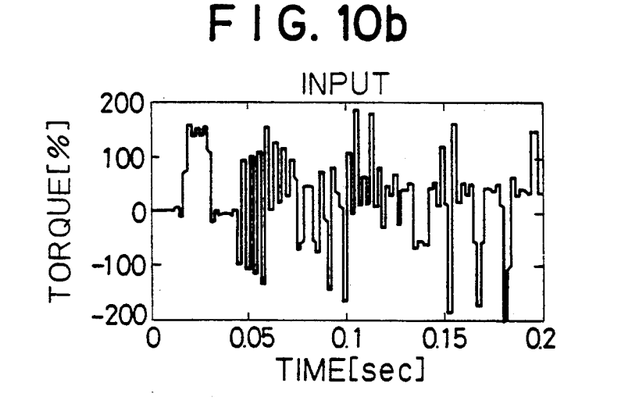
FIG. 10b is a diagram to show an input signal when the order of decimation in the above embodiment is 2.
Figure 10C:
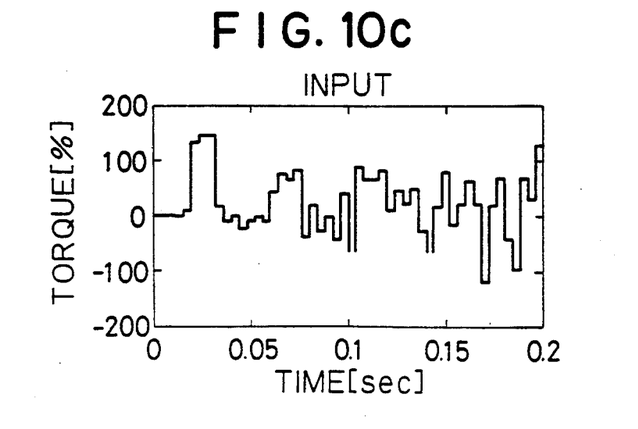
FIG. 10c is a diagram to show an input signal when the order of decimation in the above embodiment is 4.
Figure 10D:
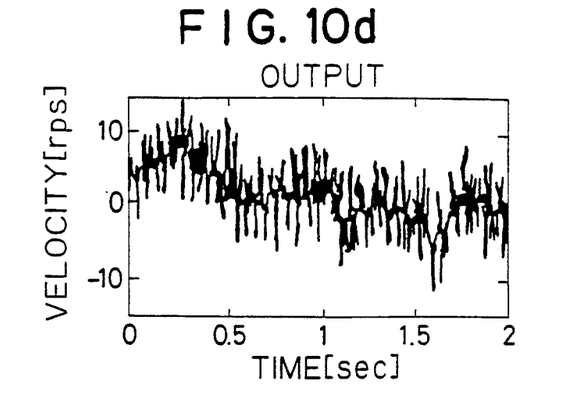
FIG. 10d is a diagram to show an output signal when the input signal shown in FIG. 10a is inputted.
Figure 10E:
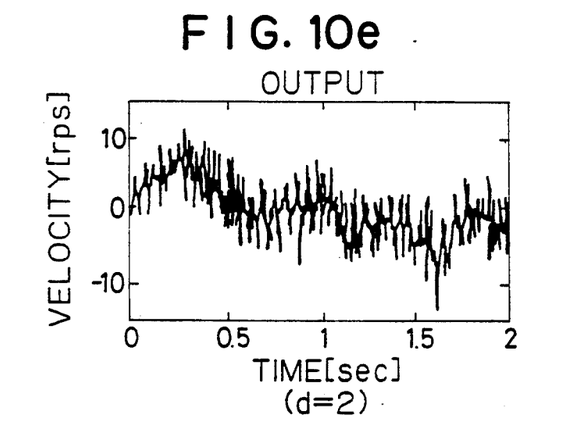
FIG. 10e is a diagram to show an output signal when the input signal shown in FIG. 10b is inputted.
Figure 10F:
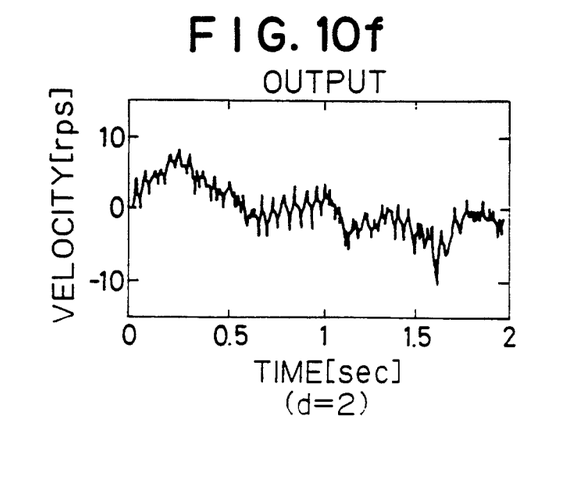
FIG. 10f is a diagram to show an output signal when the input signal shown in FIG. 10d is inputted.

In FIG. 10a, a maximum-length sequence signal as an input signal is shown, and an angular velocity output when the maximum-length sequence is inputted is shown in FIG. 10d.

Time required for the identification is two seconds (corresponding to 1990 data each of which is sampled in 1[ms]). In this case, as shown in FIG. 8, 1, 2, 4 are respectively used as the number of order of decimation for the identification of frequency response. The case of d=1 corresponds to the input and output signals shown in FIGS. 10a and 10d, while input and output signals corresponding to the cases of d=2, 4 are respectively shown in FIGS. 10e, 10d and FIGS. 10c, 10f. Then, a frequency response is obtained by processing these input and output signals shown in FIGS. 10a to 10f by the method of least squares. In this case, the input and output signals obtained through the decimation of d=1 are assigned to the frequency region over 100 Hz, and those of d=2 and d=4 are respectively assigned to the regions of 50 to 100 Hz and below 50 Hz. The resultant frequency response obtained in such a method is shown in FIGS. 11a and 11b.

Figure 11A:
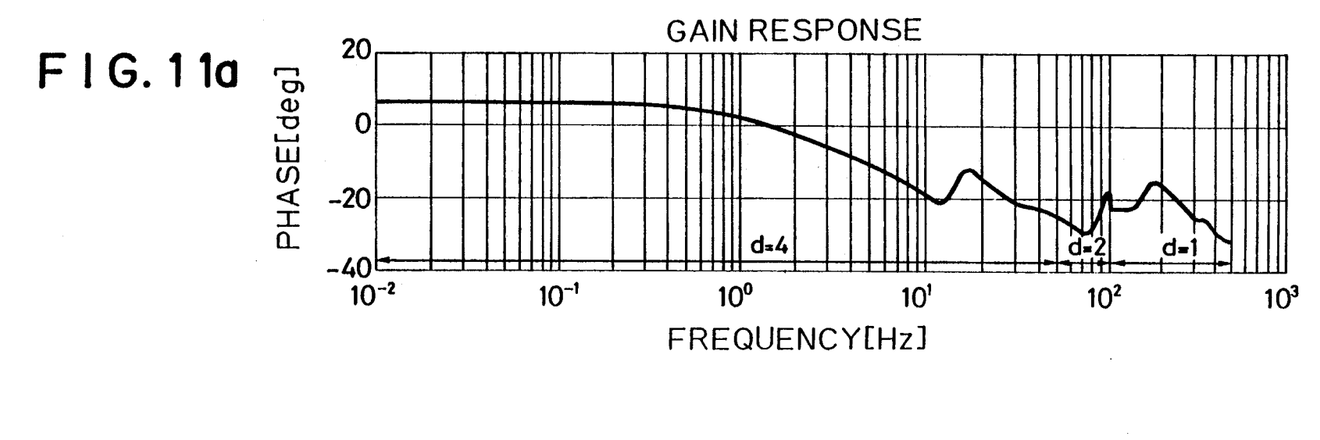
FIG. 11a is a diagram to show the relation between the frequency and gain in the above embodiment.
Figure 11B:
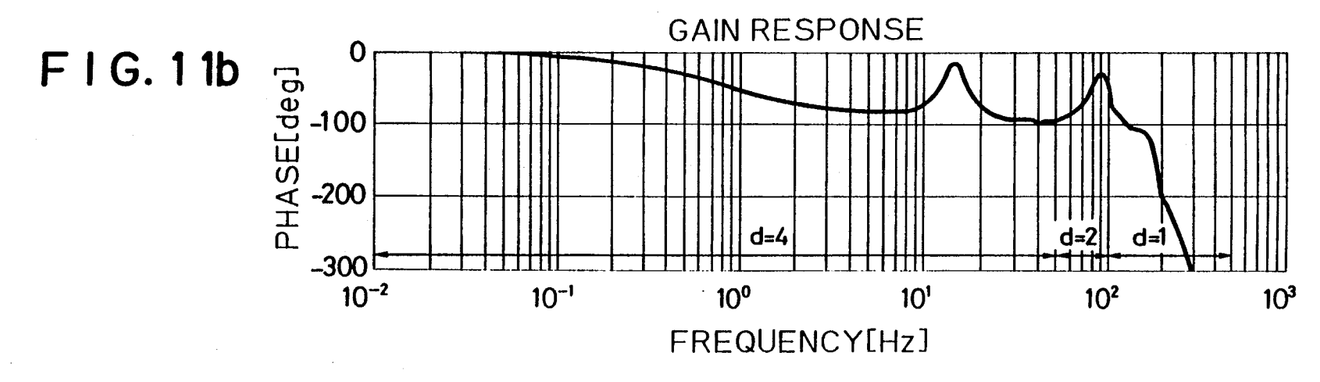
FIG. 11b is a diagram to show the relation between the frequency and phase in the above embodiment.

As shown in FIGS. 11a and 11b, according to such a multi-decimation method, it becomes possible to identify resonance points around 100 Hz and 20 Hz which can not be identified by the conventional methods.

Next, a method of estimating the result of identification by the time response is described.

Figure 12A:
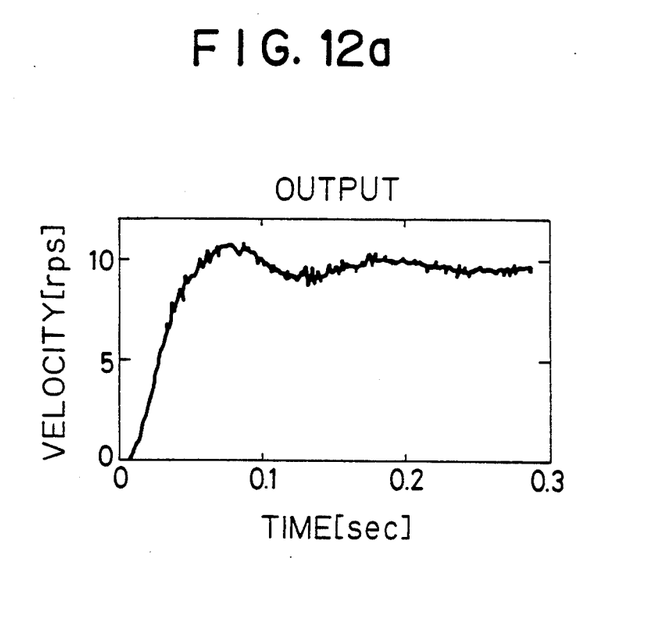
FIG. 12a is a diagram to show a step response of an actual robot.
Figure 12B:
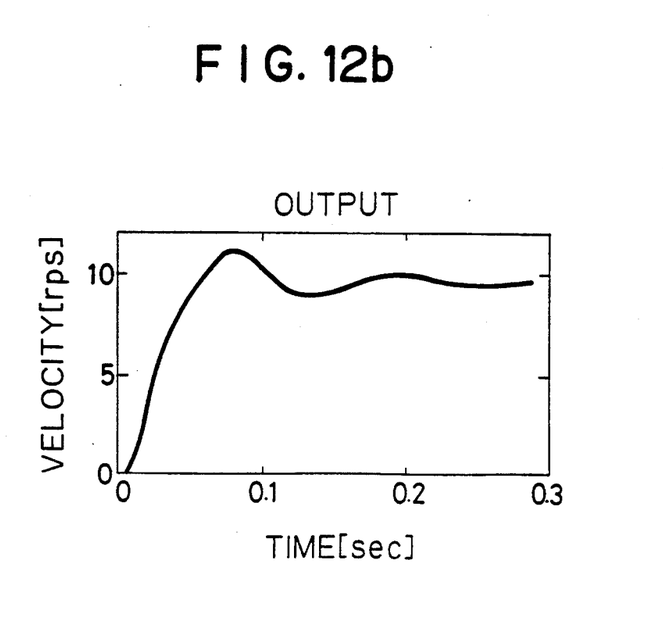
FIG. 12b is a diagram to show a step response obtained by simulation with FIGS. 11a and 11b.

FIG. 12a shows a step response when an I-P loop is constructed by an actual machine. FIG. 12b shows another step response which is obtained by the inverse Fourier transformation to the frequency response identified by the multi-decimation method. As clearly seen from these two drawings, since the identification method of this embodiment based on multi-decimation can identify the movement mode up to the low frequency region, FIG. 12b is almost in accord with FIG. 12a.

Next, effects of the adaptability controller for actual robots are described.

Figure 13A:
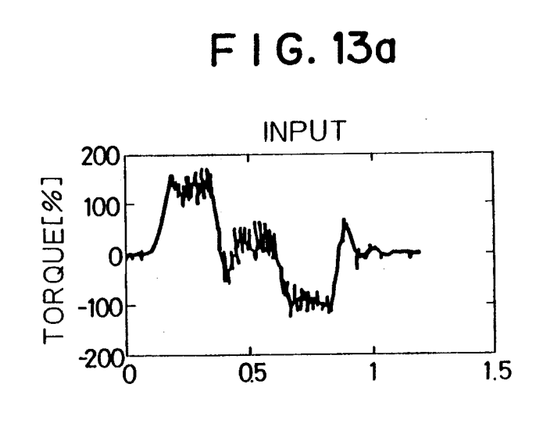
FIGS. 13a to 13d are diagrams to respectively show relations between the command input of a motor and the motor angular velocity before and after the adaptability control function is effected.
Figure 13B:
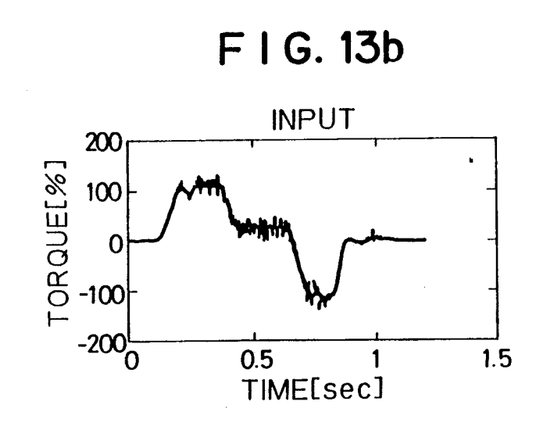
Figure 13C:
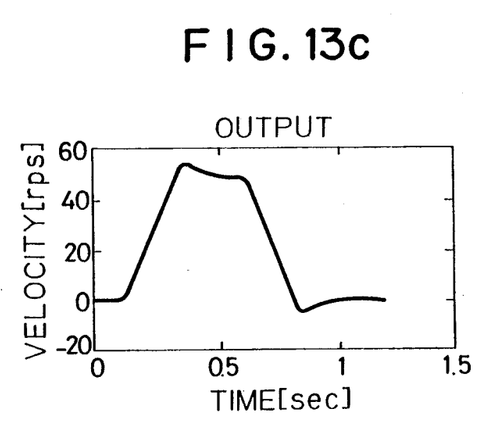
Figure 13D:
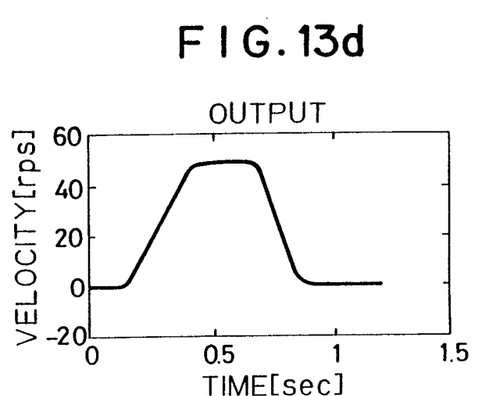

In the above case, the I-P control system is operated by giving an positional reference value for trapezoidal velocity adjustment. FIGS. 13a and 13c show a case where adjustment is carried out once by the torque command input and motor angular velocity response, however, since load applied to the arm is changed largely by a large amount, the overshoot on raising and lowering the angular velocity becomes extremely large. Thus, when the deviation supervising section 5 carries out adjustment again by using the switch 3, wave forms having almost no overshoot can be obtained, as shown in FIGS. 13b and 13d.

Incidentally, during operation of a robot, when the control mode is switched into the adjustment mode, the work of robot is suddenly stopped, thus some hindrance is likely to be caused. Therefore, the switching operation to the adjustment mode is carried out after the robot is stopped.

Moreover, in this embodiment, though a case where the adjustment of servo constant for one shaft of a robot is explained, this adjustment can be carried out in the same manner in the case of multi-shaft robots.

Furthermore, even when the shafts of a robot are variously different, the adjustment is possible by setting an algorithm for adjusting these shafts from each one nearer to the holder of the robot.

For example, when the robot arm comprises two different shafts, the adjustment is given to the first shaft nearer to the holder. At the time, the other shaft is in the servo-free state or in the non-control state. Then, the second shaft is adjusted. At the time, the first shaft is in the servo-lock state by a servo constant which is already adjusted. Thereafter, the second shaft is set in the servo-lock state by another servo constant, and the first shaft is adjusted again. Finally, the first shaft is set in the servo-lock state, then all the adjustment is completed.

Moreover, the adjustment for a robot having an arm comprising three shafts or more can be carried out in the same manner.

As stated above, according to the adaptive controller for robots related to the present invention, even when the change of load applied to a robot arm or the movement deviation caused with time exceeds a predetermined allowable value, since the servo constant can be automatically set so as to lessen the deviation between the reference movement orbit of the robot arm and the actual orbit thereof, the difficulty in setting the servo constant can be markedly reduced.

Various modifications will become possible for those skilled in the art after receiving the teachings of the present disclosure without departing from the scope thereof.

We claim:

1. An adaptive controller for driving an actuator of a robot arm under servo control where a servo constant is set such that the robot arm follows a predetermined reference movement orbit, comprising:
   (a) switching means for switching between an adjustment mode where the servo constant is adjusted and a servo control mode where the servo constant is already set;
   (b) a deviation supervising section for obtaining a deviation between an orbit of the robot arm in actual operation and a reference movement orbit thereof, and for operating the switching means to change from the servo control mode into the servo adjustment mode when the deviation exceeds a predetermined value;
   (c) dynamic-characteristic-model identifying means for identifying a movement characteristic of the robot arm when the servo control mode is changed into the servo adjustment mode by the deviation supervising section and the switching means, wherein the dynamic-characteristic-model identifying means comprises
   a signal generating section for generating a signal for identification over a wide frequency region.
   a decimation section for sampling input and output signals obtained when the robot arm is operated by an identification signal generated from the signal generating section, and for dividing the sampled input and output signals into a plurality of frequency regions by a plurality of low-pass filters, resampling the divided input and output signals with thinning out at cycles corresponding to the plurality of frequency regions, and identifying frequency responses corresponding to the frequency regions by processing the resampled input and output signals based on the method of least squares, and a frequency response linking section for linking the frequency responses identified by the decimation section so as to obtain a frequency response over a wide frequency range; and (d) a servo constant calculating section for calculating a new servo constant for reducing the deviation obtained by the deviation supervising section based on the identification result from the frequency response linking section means.

2. The adaptive controller according to claim 1, wherein the deviation supervising section, when a new servo constant is set by calculation by the servo constant calculating section, recognizes that the deviation is in the predetermined range, then changes the adjustment mode into the control mode by operating the switching means.

3. The adaptive controller according to claim 1, wherein the dynamic-characteristic-model identifying means identifies a frequency response over a wide frequency region by linking the frequency responses corresponding to the respective frequency regions and obtained by the process based on the least squares method.

4. The adaptive controller according to claim 3, wherein the servo constant calculating section comprises an I-PD control system.

5. An adaptive controller for robots for driving a robot arm in accordance with a servo constant such that the robot arm follows a predetermined reference movement orbit, comprising:

(a) a servo controlling section for supplying a control signal of the robot arm in accordance with the reference movement orbit;

(b) an identification signal generating section for generating an identification signal having a wide frequency region;

(c) a dynamic-characteristic-model identifying section for identifying a movement characteristic of the robot arm, wherein the dynamic-characteristic-model identifying section comprises a decimation section for sampling input and output signals of the robot arm obtained when the robot arm is operated by the identification signal, dividing the sampled input and output signals into a plurality of frequency regions by a plurality of low-pass filters, resampling the divided input and output signals with thinning out at cycles corresponding to the number of frequency regions, and identtifying frequency response corresponding to the frequency regions by processing the resampled input and output signals based on the method of least squares, and a frequency linking section for linking the frequency responses identified by the decimation section so as to obtain a frequency response over a wide frequency range;

(d) a servo constant calculating section for calculating a new servo constant based on the identification result from the frequency response linking section;

(e) switching means for switching between a servo control mode, where only the servo controlling section is connected to the robot arm, and an adjustment mode wherein only the identification signal generation section is connected to the robot arm, the dynamic-characteristic-model identifying section is connected to an input and output of the robot arm, and the servo constant calculating section is connected to the servo controlling section for supplying the new servo constant to the servo controlling section; and (f) a deviation supervising section for obtaining a deviation of the robot arm and operating the switching means to change the servo control mode intot he servo adjustment mode when the obtained deviation exceeds a predetermined value.

* * * * *